United States Patent
Kabbani

(10) Patent No.: US 9,313,147 B1
(45) Date of Patent: Apr. 12, 2016

(54) CUTTING AND ADDING LINKS WITHIN A SWITCH

(71) Applicant: GOOGLE INC., Mountain View, CA (US)

(72) Inventor: Abdul Kabbani, Los Gatos, CA (US)

(73) Assignee: Google Inc., Mountain View, CA (US)

( * ) Notice: Subject to any disclaimer, the term of this patent is extended or adjusted under 35 U.S.C. 154(b) by 112 days.

(21) Appl. No.: 14/164,666

(22) Filed: Jan. 27, 2014

(51) Int. Cl.
*H04L 12/933* (2013.01)
*H04L 12/24* (2006.01)
*H04Q 11/00* (2006.01)

(52) U.S. Cl.
CPC .............. *H04L 49/15* (2013.01); *H04L 41/12* (2013.01); *H04Q 11/0005* (2013.01)

(58) Field of Classification Search
None
See application file for complete search history.

(56) References Cited

PUBLICATIONS

Farrington, et al, "Helios: A Hybrid Electrical/Optical Switch Architecture for Modular Data Centers", SIGCOMM '10, Aug. 30-Sep. 3, 2010, 12 pages.

*Primary Examiner* — Min Jung
(74) *Attorney, Agent, or Firm* — Foley & Lardner LLP; Edward A. Gordon

(57) ABSTRACT

A non-transitory computer-readable storage medium may include instructions stored thereon that, when executed by at least one processor, are configured to cause a computing system to at least cut a surplus link at a first switch between an old super block and an old spine block, add a first new link between the old super block and a new spine block, add a second new link between the old spine block and a new super block, continue to cut surplus links and add new links until determining that adding a new link at the first switch would result in an excess of links, and swap a link from the first switch with a link from a second switch.

20 Claims, 13 Drawing Sheets

Delta Matrix 306

| | Column[0] | Column[1] | Column[2] | Column[3] | Column[4] |
|---|---|---|---|---|---|
| Row[0] | 6 | 6 | 7 | 7 | -26 |
| Row[1] | 6 | 6 | 6 | 7 | -25 |
| Row[2] | 7 | 6 | 6 | 6 | -25 |
| Row[3] | 7 | 7 | 6 | 6 | -26 |
| Row[4] | -26 | -25 | -25 | -26 | |

FIG. 3C

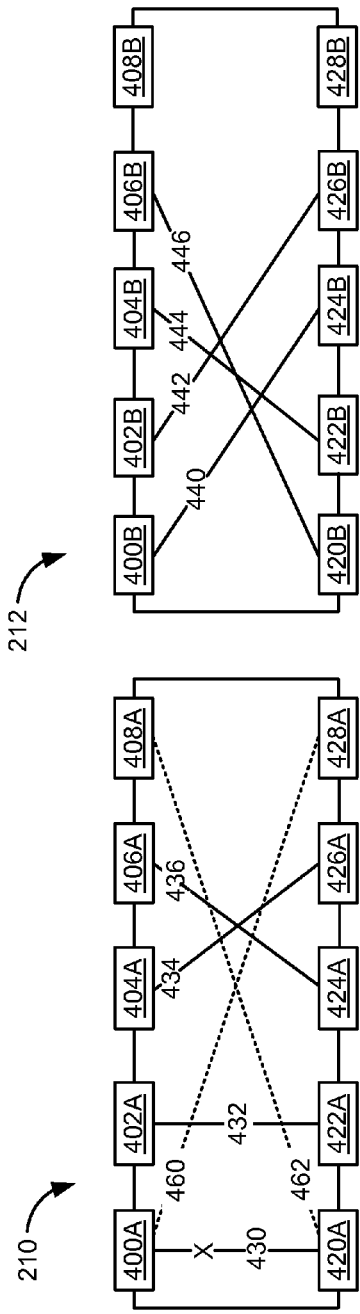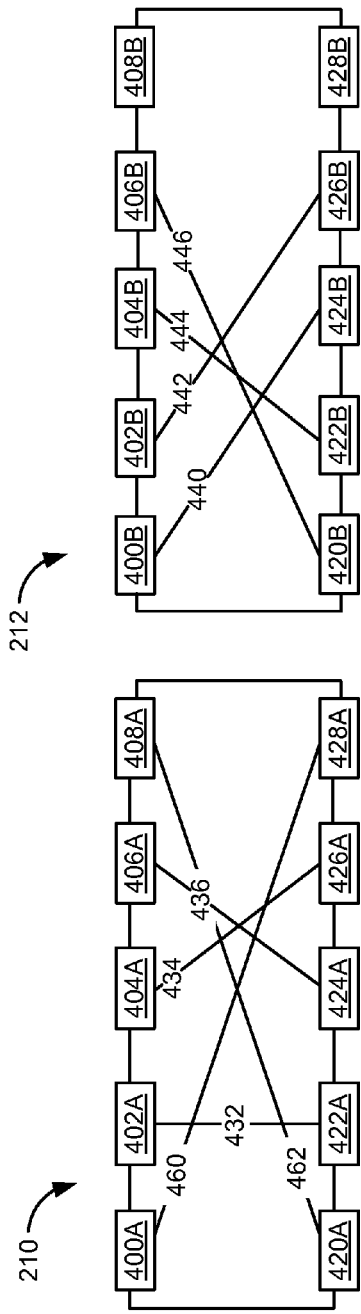
FIG. 5C
FIG. 5D

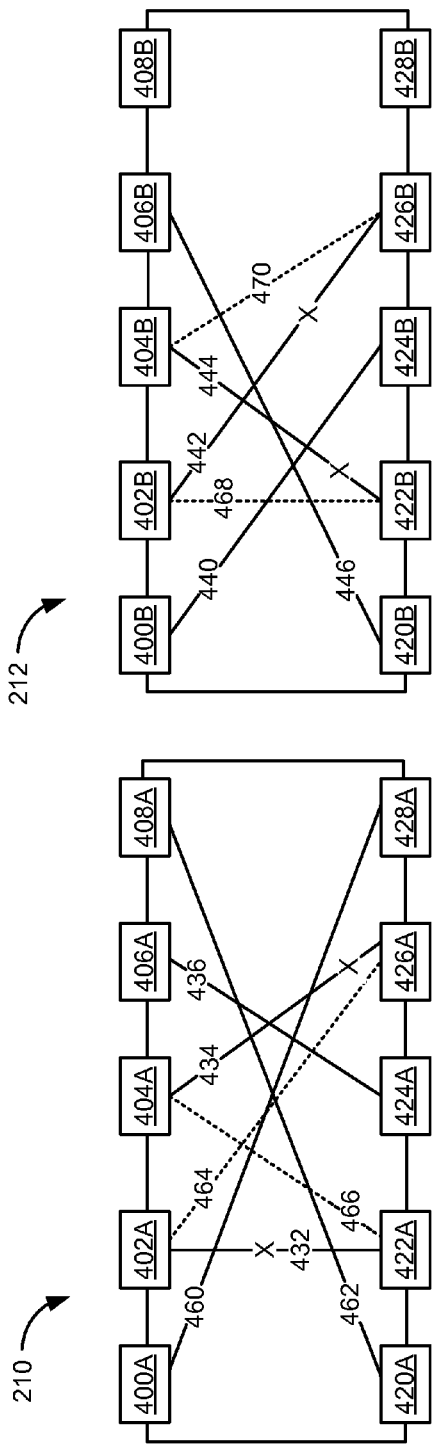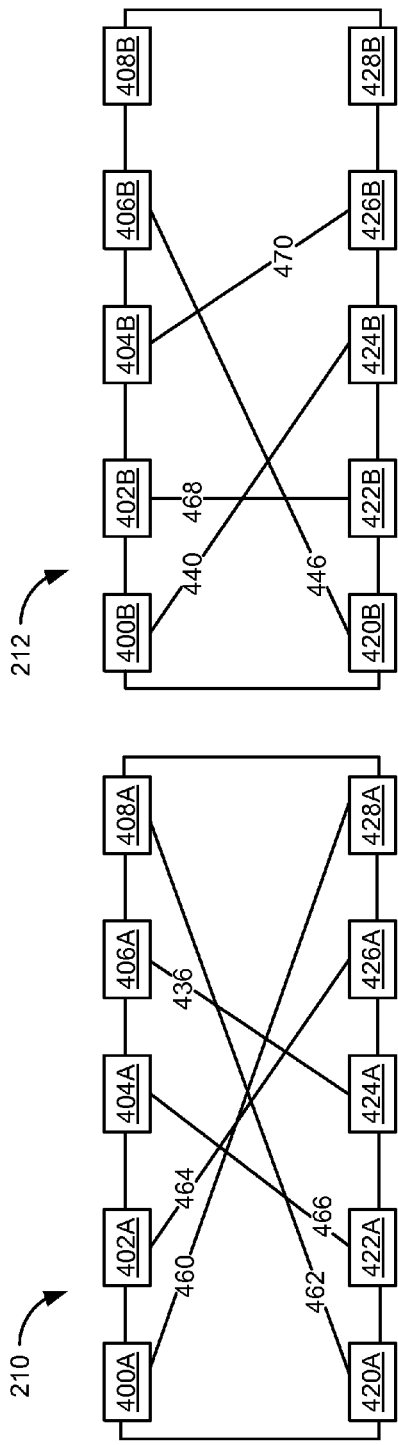
FIG. 5E
FIG. 5F

CUTTING AND ADDING LINKS WITHIN A SWITCH

TECHNICAL FIELD

This description relates to switches.

BACKGROUND

Routing or switching systems may route data between computing devices. When new computing devices are added to the system, some links between computing devices may be cut or disconnected to accommodate adding new links to the new computing devices. The time between cutting old links and adding new links may result in loss of data.

SUMMARY

According to an example embodiment, a non-transitory computer-readable storage medium comprising instructions stored thereon. When executed by at least one processor, the instructions may be configured to cause a computing system to at least cut, at a first switch, a surplus link between an old super block and an old spine block, the old super block being one of a plurality of old super blocks and the old spine block being one of a plurality of old spine blocks, add, at the first switch, a first new link between the old super block and a new spine block, add, at the first switch, a second new link between the old spine block and a new super block, continue to cut surplus links and add new links at the first switch until determining that adding a new link at the first switch would result in an excess of links at either the new super block or the new spine block, and swap a link from the first switch with a link from a second switch based on the determining that adding the new link at the first switch would result in the excess of links at either the new super block or the new spin block.

According to another example embodiment, a non-transitory computer-readable storage medium comprising instructions stored thereon. When executed by at least one processor, the instructions may be configured to cause a computing system to at least determine that a first old link between a first old super block and a first old spine block should be moved from a first switch to a second switch to add a first new link on the second switch between the first old super block and a new spine block and a second new link on the second switch between a new super block and the first old spine block, move the first old link between the first old super block and the first old spine block from the first switch to the second switch, add, on the second switch, the first new link between the first old super block and the new spine block, and add, on the second switch, the second new link between the new super block and the first old spine block.

According to another example embodiment, a non-transitory computer-readable storage medium may include instructions stored thereon for swapping links between a first switch to a second switch to facilitate adding links to the second switch that cannot be added to the first switch. The instructions may be configured to, when executed by at least one processor, cause a computing system to at least swap a first link between a first super block and a first spine block from the first switch to the second switch, swap a second link between the first super block and a second spine block from the second switch to the first switch, swap a third link between a second super block and the second spine block from the first switch to the second switch, and swap a fourth link between the second super block and the first spine block from the second switch to the first switch.

The details of one or more implementations are set forth in the accompa-nying drawings and the description below. Other features will be apparent from the description and drawings, and from the claims.

BRIEF DESCRIPTION OF THE DRAWINGS

FIG. 3C shows a delta matrix according to an example implementation.

FIGS. 5A through 5H show stages of cutting and adding links to add links to new blocks according to an example implementation.

DETAILED DESCRIPTION

Figure 1:
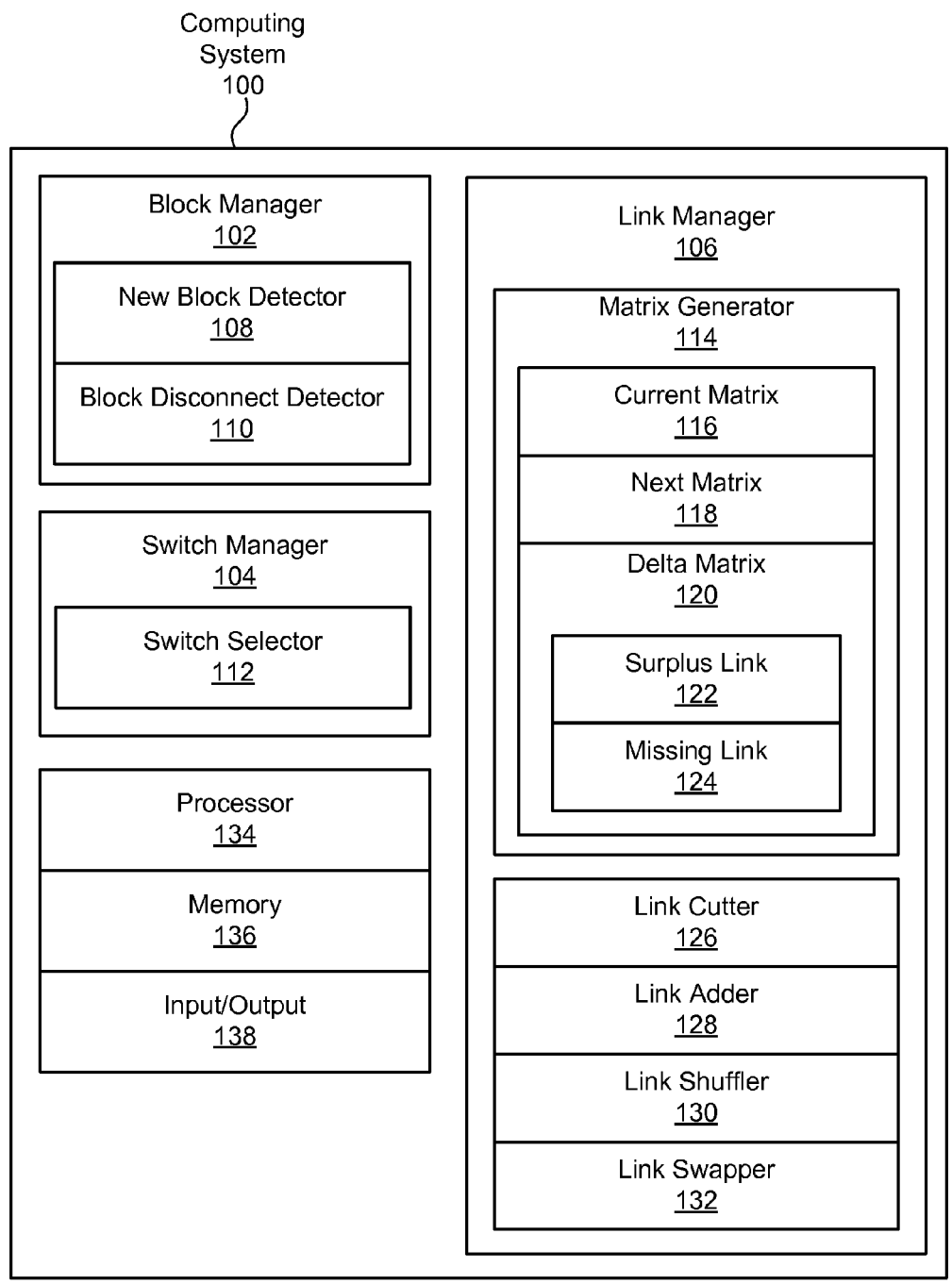
FIG. 1 is a diagram of a computing system for adding blocks while minimizing downtime of links according to an example implementation.

FIG. 1 is a diagram of a computing system 100 for adding blocks while minimizing downtime of links according to an example implementation. The blocks may include super blocks (not shown in FIG. 1), which may represent computing systems such as servers, and spine blocks (not shown in FIG. 1), which may represent computing systems that route data between the super blocks. The super blocks may be coupled to the spine blocks via switches (not shown in FIG. 1). The computing system 100 may be included in, and/or distributed through, the switches, and/or may be a separate device that controls the switches. The computing system 100 may control the cutting (or disconnecting) and adding (or connecting) of links within the switches. The links within the switches may be optical links coupling ports that are connected to blocks, such as in a Hybrid Electrical/Optical Switch Architecture (Helios). The switches may include any type of switch that may change or reroute connections between external computing devices coupled to the switches, such as via ports. One example of the switches is Optical Circuit Switches (OCSs).

In an example implementation, the computing system 100 may rearrange the links between blocks within the switches to accommodate new blocks being added to the system. The computing system 100 may rearrange the links in such a manner as to minimize throughput loss between the blocks. The switches may each be able to link a limited number of super blocks to a same number of spine blocks, and the number of switches may remain the same when a super block and a spine block are added. To link the new (or added) super block to old (or pre-existing or already connected) spine blocks, and to link the new spine block to old super blocks, the switches may cut links between old super blocks and old spine blocks. Cutting the links between old super blocks and old spine blocks may make links available to link and/or couple some of the old super blocks to the new spine block and to link and/or couple some of the old spine blocks to the new super block.

When there are a large number of links to be cut and added, for each link cut between an old super block and an old spine block, two links may be added. The two links may include a link between the old super block and the new spine block, and a link between the old spine block and the new super block. The order of cutting links may be predetermined or random.

After cutting and adding links at a given switch, there may come a point when adding a new link would result in an excess of links at either (or both of) the new super block or the new spine block. The excess may result from the new super block or spine block needing more links at the switch than the switch can accommodate. When the computing system 100 determines that adding a new link would result in an excess of links, the computing system 100 may determine that an old link should be moved from a first switch to a second switch. Based on determining that the old link should be moved from the first switch to the second switch, the computing system 100 may instruct the first switch to swap the old link with another old link from the second switch. Swapping the link may reduce throughput loss compared to simply cutting links and then adding links.

The swapping may include swapping and/or moving an old link between a first old super block and a first old spine block from the first switch to the second switch, swapping and/or moving a second link between the first old super block and a second old spine block from the second switch to the first switch, swapping and/or moving a third link between a second old super block and the second old spine block from the first switch to the second switch, and swapping a fourth link between the second old super block and the first old spine block from the second switch to the first switch. Swapping the link from the first switch to the second switch may allow the new links, between the first old super block and the new spine block and between the first old spine block and the new super block, to be added at the second switch, after the old link is cut at the second switch.

The computing system 100 may include a block manager 102 for determining when new blocks are added or old blocks are removed from a system which includes the computing system 100, switches (not shown in FIG. 1), and computing blocks (not shown in FIG. 1), which may include super blocks and/or spine blocks. The adding new blocks to the system or removing old blocks from the system may prompt the computing system 100 to generate instructions to add and/or cut or disconnect links between added blocks, removed blocks, and/or old blocks which were included in the system. The computing system 100 may also include a switch manager 104 for determining which switches to add or remove links from. The switch manager 104 may determine which switches to add links to, or remove links from, to accommodate the adding of new blocks or removing of old blocks. The computing system 100 may also include a link manager 106 for adding and removing links. The link manager 106 may determine links to cut or disconnect, add or connect, shuffle, and/or swap to accommodate new computing blocks being added to the system and/or old computing blocks being removed from the system.

The block manager 102 may detect when new computing blocks, such as superblocks and/or spine blocks, are added, and/or when old computing blocks are disconnected from the system. The block manager 102 may pass information regarding adding and/or disconnecting computing blocks to the switch manager 104 and/or to the link manager 106. The switch manager 104 and/or the link manager 106 may respond to the information by selecting a switch(s) to add links to old and/or new computing blocks, and/or to cut links from new and/or old computing blocks.

The block manager 102 may include a new block detector 108. The new block detector 108 may detect new blocks being added to the system. The new block detector 108 may send a new block message to the switch manager 104 and/or the link manager 106, prompting the switch manager 104 and/or the link manager 106 to add new links to the new blocks. In some circumstances, adding the new links to the new blocks may necessitate cutting old links from old blocks, and/or shuffling or swapping links between switches.

The block manager 102 may include a block disconnect detector 110. The block disconnect detector 110 may detect the disconnection of a block from the system. The block disconnect detector 110 may send a block disconnect message to the switch manager 104 and/or the link manager 106, prompting the switch manager 104 and/or the link manager 106 to cut and/or reassign links.

The switch manager 104 may determine switches for adding links to computing blocks and/or cutting links from computing blocks. The switch manager 104 may include a switch selector 112. The switch selector 112 may select a switch for adding, cutting, shuffling, and/or swapping links.

The link manager 106 may determine current or old links, determine links to be added after a block has been added, and may determine changes to be made (such as link shuffling and/or link swapping) to achieve the final set of links. The link manager 106 may determine surplus links and missing links, and may determine which links should be cut, added, shuffled, and/or swapped.

The link manager 106 may include a matrix generator 114. The matrix generator 114 may generate matrices which indicate and/or store current numbers of links between super blocks and spine blocks, numbers of links between blocks to be achieved to accommodate computing blocks being added and/or removed, and/or a delta or change from the current numbers of links to the number of links to be achieved.

The matrix generator 114 may include a current matrix generator 116. The current matrix generator 116 may generate a current matrix showing the number of links between each super block and each spine block. An example of a current matrix is shown and described with respect to FIG. 3A. The matrix generator 114 may also include a next matrix generator 118. The next matrix generator 118 may generate a next matrix indicating numbers of links between each super block and each spine block to accommodate computing blocks being added and/or removed. An example of the next matrix is shown and described with respect to FIG. 4B.

The link manager 106 may also include a delta matrix generator 120. The delta matrix generator 120 may generate a delta matrix which indicates a number of surplus links to be cut and a number of missing links to be added to transition from the current matrix to the next matrix. The delta matrix may represent a difference between the current matrix and the next matrix. The delta matrix generator 120 may include a surplus link determiner 122 for determining a number of surplus links in each block, and a missing link determiner 124 for determining a number of missing links in each block. An example of a delta matrix is shown in FIG. 4C.

The link manager 106 may also include a link cutter 126. The link cutter 126 may determine links to cut, and/or implement the cutting of the links between computing blocks such as by sending cut instructions to the switch(es). The link manager 106 may also include a link adder 128. The link adder 128 may determine links to add, and/or implement the adding of the link between computing blocks such as by sending add instructions to the switch(es). The link manager 106 may include a link shuffler 130. The link shuffler 130 may shuffle links between switches to facilitate adding links without exceeding link capacities of switches and/or computing blocks. The link shuffling may include cutting and/or adding links. Shuffling links is described further below. The link manager 106 may also include a link swapper 132. The link swapper 132 may swap links between switches to facilitate adding links to new computing blocks. Link swapping may include cutting and/or adding links. Swapping links is described in further detail below.

Figure 2A:
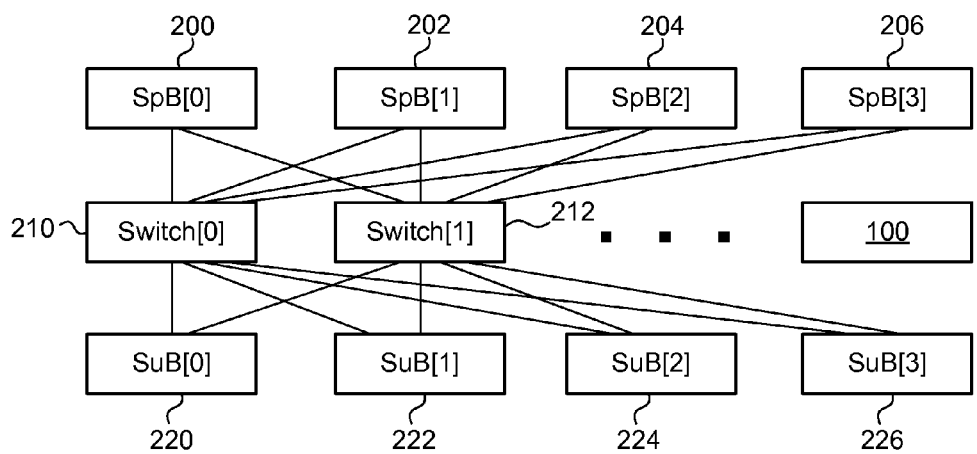
FIG. 2A is a diagram of a system with blocks linked by switches according to an example implementation.

FIG. 2A is a diagram of a system with blocks 200, 202, 204, 206, 220, 222, 224, 226 linked by switches 210, 212 according to an example implementation. In this example, the system may include four super blocks 220, 222, 224, 226. While four super blocks 220, 222, 224, 226 are shown in FIG. 2A, any number of four super blocks 220, 222, 224, 226 may be included in the system. The super blocks 220, 222, 224, 226 may include computing systems, such as servers, within a data center. The super blocks 220, 222, 224, 226 may communicate with each other via spine blocks 200, 202, 204, 206. The spine blocks 200, 202, 204, 206 may serve as routers or switches, routing data between the super blocks 220, 222, 224, 226. The super blocks 220, 222, 224, 226 may be coupled to each other via switches 210, 212. The switches 210, 212 may route data between the super blocks 220, 222, 224, 226 and the spine blocks 200, 202, 204, 206.

The switches 210, 212 may include Optical Circuit Switches (OCSs) within a Hybrid Electrical/Optical Switch Architecture (Helios). The switches 210, 212 may be electrically coupled to each of the computing blocks 200, 202, 204, 206, 220, 222, 224, 226, such as by twisted pair or Ethernet connections. While FIG. 2A shows each switch 210, 212 having one link to each block 200, 202, 204, 206, 220, 222, 224, 226 the switches 210, 212 may have any integer number of links to each block 200, 202, 204, 206, 220, 222, 224, 226.

The switches 210, 212 may internally link a super block 220, 222, 224, 226 to a spine block 200, 202, 204, 206, and/or internally link a spine block 200, 202, 204, 206 to a super block 220, 222, 224, 226, by an optical link. The switches 210, 212 may, for example, rotate and/or shift internal mirrors to change which spine block 200, 202, 204, 206 a given super block 220, 222, 224, 226 is linked to. Rotating and/or shifting internal mirrors may enable the linking and/or coupling of blocks 200, 202, 204, 206, 220, 222, 224, 226 to be changed more quickly than by physically unplugging electrical plugs and plugging the plugs into new electrical ports, reducing throughput loss.

The computing system 100 may control the switches 210, 212 by instructing the switches 210, 212 to add and/or cut links to and/or from the computing blocks 200, 204, 204, 206, 220, 222, 224, 226. The computing system 100 may be a separate device within the system, or the functions and processes described with respect to the computing system 100 may be distributed throughout the switches 210, 212.

While two switches 210, 212 are shown in FIG. 1 for illustrative purposes, the system may include any number of switches 210, 212. Each switch 210, 212 may link a maximum of an integer number, such as L, super blocks 220, 222, 224, 226 to each spine block 200, 202, 204, 206, and the same maximum number L spine blocks 200, 202, 204, 206 to each super block 220, 222, 224, 226. In the example shown in FIG. 2A, L is 1. Each super block 220, 222, 224, 226 may be coupled to each spine block 200, 202, 204, 206 by a maximum of (L*O) links, where O is the number of switches 210, 212 in the system.

Figure 3A:
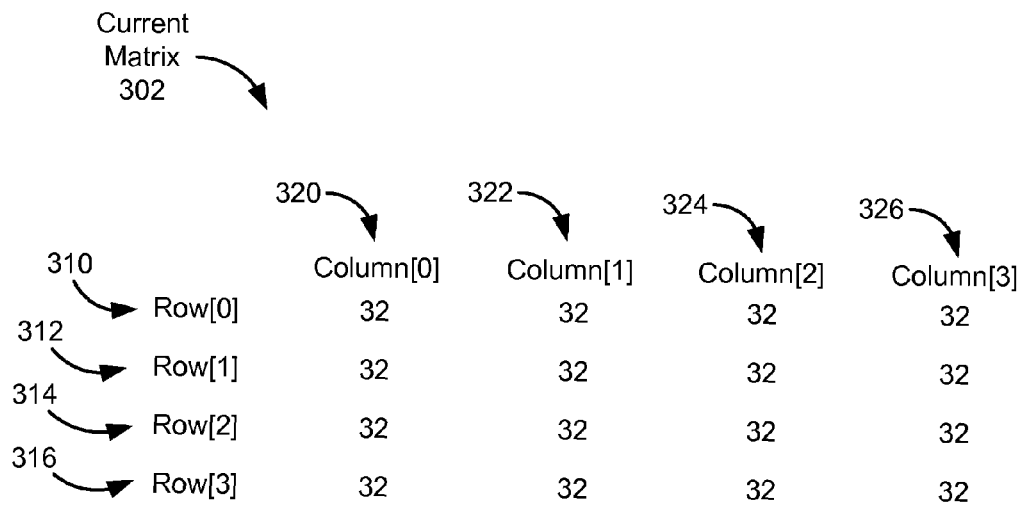
FIG. 3A shows a current matrix according to an example implementation.

FIG. 3A show a current matrix 302 according to an example implementation. The current matrix 302 may have been generated by the current matrix generator 116. The current matrix 302 may indicate the number of links from each super block 220, 222, 224, 226 to each spine block 200, 202, 204, 206.

In the example shown in FIG. 3A, L=128 switches 210, 212 in the system, the system includes four super blocks 220, 222, 224, 226 (as shown in FIG. 2A), and the system includes four spine blocks 200, 202, 204, 206 (as shown in FIG. 2A). In this example, Row[0] 310 shows the number of links between super block[0] 220 and each of the four spine blocks 220, 222, 224, 226; in this example, with 128 switches that each have one link to each super block 200, 202, 204, 206, and one link to each spine block 220, 222, 224, 226, the super block[0] has thirty-two links to spine block[0] (as shown by Column[0] 320), thirty-two links to spine block[1] (as shown by Column[1] 322), thirty-two links to spine block[2] (as shown by Column[2] 324), and thirty-two links to spine block[3] (as shown by Column[3] 326). The other three rows, Row[1] 312, Row[2] 314, and Row[3] 316, show that the other super blocks 222, 224, 226 also have thirty to links to each of the spine blocks 200, 202, 204, 206.

As shown in FIG. 3A, each row 310, 312, 314, 316, which represents links for each super block 220, 222, 224, 226, has a total of 128 (32*4) links. Similarly, each column 320, 322, 324, 326, which represents links for each spine block 200, 202, 204, 206, also has a total of 128 (32*4) links. The 128 links per block 200, 202, 204, 206, 220, 222, 224, 226 represent the maximum number of links per block in the example of 128 switches when each switch can have a maximum of one connection to each block. Other numbers of links for each block may exist in systems which have different numbers of switches and/or different maximum numbers of connections per switch.

Figure 2B:
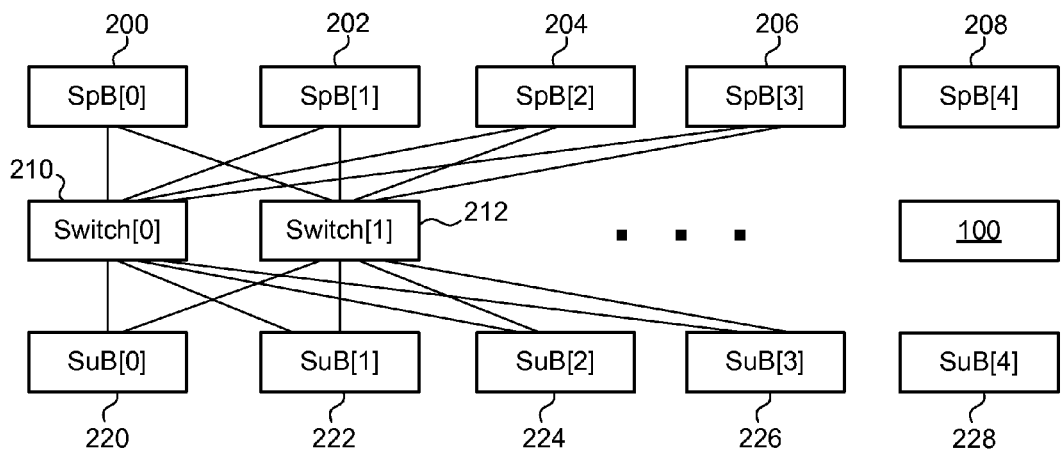
FIG. 2B is a diagram of the system of FIG. 2A with new blocks added according to an example implementation.

FIG. 2B is a diagram of the system of FIG. 2A with new blocks added according to an example implementation. In this example, a new super block, Super Block[4] 228, has been added along with the old super blocks 220, 222, 224, 226, and a new spine block, Spine Block[4] 208, has been added along with the old spine blocks 200, 202, 204, 206. At the initial addition of the Super Block[4] and Spine Block[4], Super Block[4] may not be coupled to any of the switches 210, 212 or any of the spine blocks 200, 202, 204, 206, 208, and the Spine Block[4] may not be coupled to any of the switches 210, 212 or any of the super blocks 220, 222, 224, 226, 228. The next matrix generator 118 of the matrix generator 114 of the link manager 106 of the computing system 100 may determine numbers of links between each of the super blocks 220, 222, 224, 226, 228 and each of the spine blocks 200, 202, 204, 206, 208 after the addition of the Super Block[4] and Spine Block[4] to the system.

In response to the new super block and new spine block being added to the system, the next matrix generator 118 of the matrix generator 114 of the link manager 106 of the computing system 100 may generate a next matrix. The next matrix may represent numbers of links between each of the old super blocks 220, 222, 224, 226 and the new super block 228, and between each of the old spine blocks 200, 202, 204, 206 and the new spine block 208, after the new super block 228 and new spine block 208 have been coupled and/or linked to spine blocks 200, 202, 204, 206, 208 and super blocks 220, 222, 224, 226, 228, respectively.

Figure 3B:
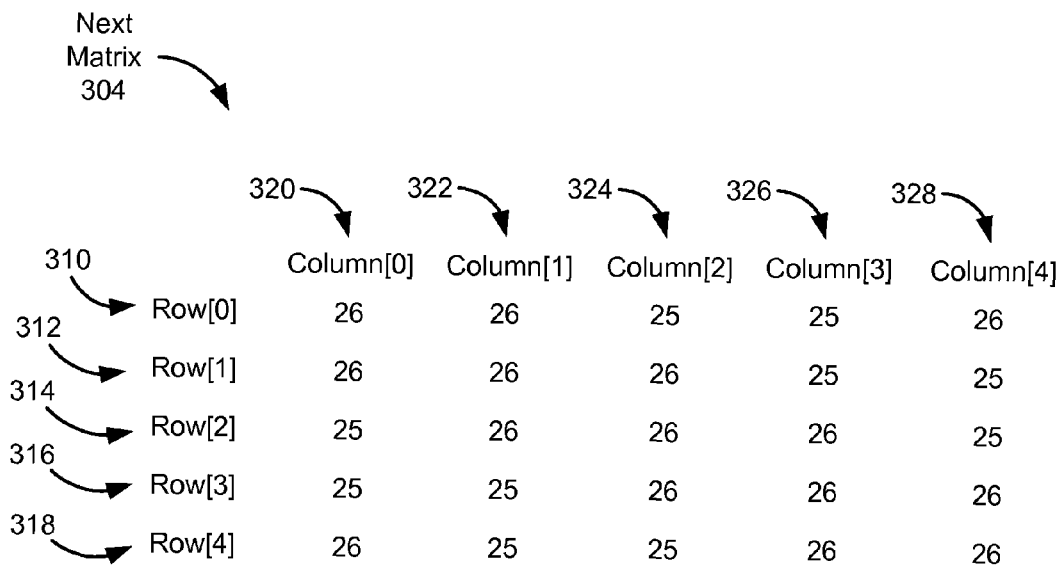
FIG. 3B shows a next matrix according to an example implementation.

FIG. 3B shows a next matrix 304 according to an example implementation. The next matrix 304 indicates numbers of links between each of the super blocks 220, 222, 224, 226, 228 and each of the spine blocks 200, 202, 204, 206, 208. The next matrix includes a new Row[4] 318 representing numbers of spine blocks 200, 202, 204, 206, 208 linked and/or coupled to the new super block 228, and a new Column[4] 328 representing numbers of super blocks 220, 222, 224, 226, 228 coupled to the new spine block 208.

As in the current matrix 302, each row 310, 312, 314, 316, 318 including the new row 318, and each column 320, 322, 324, 326, 328 including the new column 328, has a total of 128 links. The number of links for each computing block 200, 202, 204, 206, 208, 220, 222, 224, 226, 228 remains the same after the new blocks 208, 228 have been incorporated into the system. Because the number of links remains the same, but the number of blocks 200, 202, 204, 206, 208, 220, 222, 224, 226, 228 that each block 200, 202, 204, 206, 208, 220, 222, 224, 226, 228 is linked to has increased, the number of links between each pair of blocks 200, 202, 204, 206, 208, 220, 222, 224, 226, 228 decreases. In the example shown in FIG. 3B, the number of links between each pair of old computing blocks 200, 202, 204, 206, 220, 222, 224, 226 has decreased from thirty-two to either twenty-five or twenty-six. The number of links between the new blocks 208, 228 and the other blocks 200, 202, 204, 206, 208, 220, 222, 224, 226, 228 is also either twenty-five or twenty-six.

To achieve the number of links indicated by the next matrix 304, some of the links between old blocks 200, 202, 204, 206, 220, 222, 224, 226 will be cut and/or disconnected, and links between the new blocks 208, 228 and both old and new blocks 200, 202, 204, 206, 208, 220, 222, 224, 226, 228 will be added. The delta matrix generator 120 of the matrix generator 114 of the link manager 106 of the computing system 100 may generate a delta matrix indicating numbers of links between pairs of old blocks 200, 202, 204, 206, 220, 222, 224, 226 to be cut and numbers of links between the new blocks 208, 228 and the old blocks 200, 202, 204, 206, 220, 222, 224, 226 to be added. The delta matrix may be computed as a difference between the current matrix 302 and the next matrix 304. A surplus link determiner 122 of the delta matrix generator 120 may determine surplus links between the old blocks 200, 202, 204, 206, 220, 222, 224, 226 to be cut. A missing link determiner 124 of the delta matrix generator 120 may determine links between the new blocks 208, 228 and other blocks 200, 202, 204, 206, 208, 220, 222, 224, 226, 228 that are missing and should be added.

FIG. 3C shows a delta matrix 306 according to an example implementation. In this example, the positive numbers at the intersections of Rows[0-3] 312, 314, 316, 318 and Columns [0-3] 320, 322, 324, 326 represent numbers of surplus links between old blocks 200, 202, 204, 206, 220, 222, 224, 226 to be cut. In this example, the negative numbers in Row[4] 318 represent missing links to be added to the new super block 228, and the negative numbers in Column[4] 328 represent missing links to be added to the new spine block 208. This is merely an example. Other numbers of links could be cut and added, and the links to be cut could be represented by negative numbers and links to be added could be represented by positive numbers.

Figure 2C:
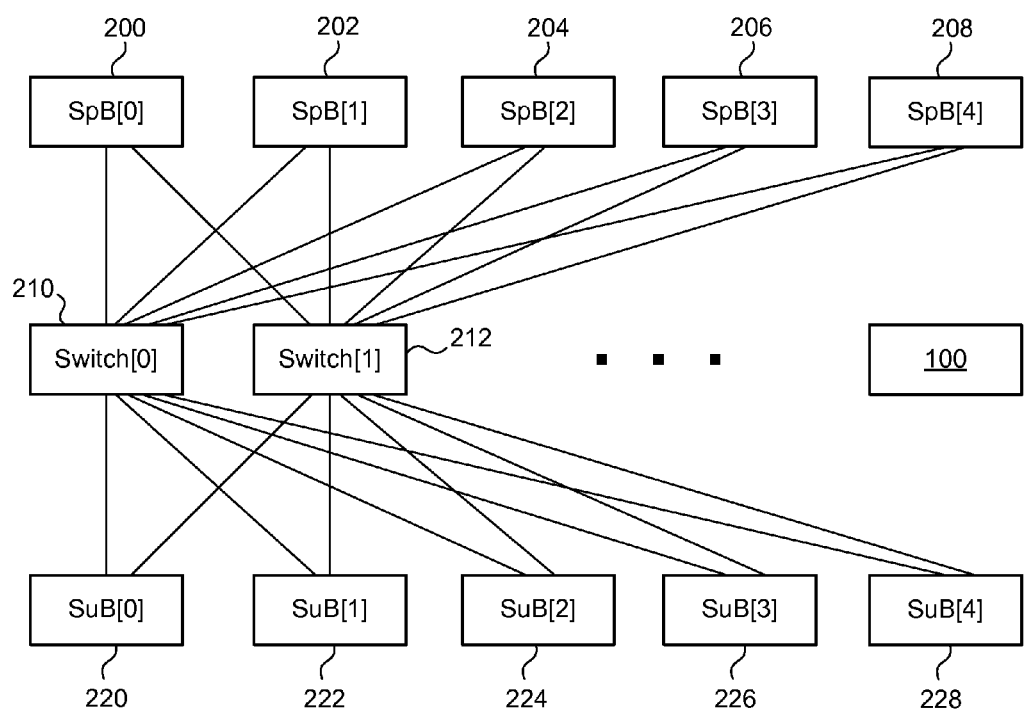
FIG. 2C is a diagram of the system of FIG. 2B with links added to the new blocks according to an example implementation.

FIG. 2C is a diagram of the system of FIG. 2B with links added to the new blocks 208, 228 according to an example implementation. As shown in FIG. 2C, each of the switches 210, 212 is coupled to each of the blocks 200, 202, 204, 206, 208, 220, 222, 224, 226, 228. In an example in which the system includes 128 switches 210, 212, each block 200, 202, 204, 206, 208, 220, 222, 224, 226, 228 will have 128 links to other blocks. FIG. 2C may represent an example configuration in which the numbers of links indicated by the next matrix 304 have been achieved. In an example implementation, numbers of links between each pair of blocks may be represented by the next matrix 304 shown in FIG. 3B.

Figure 4:
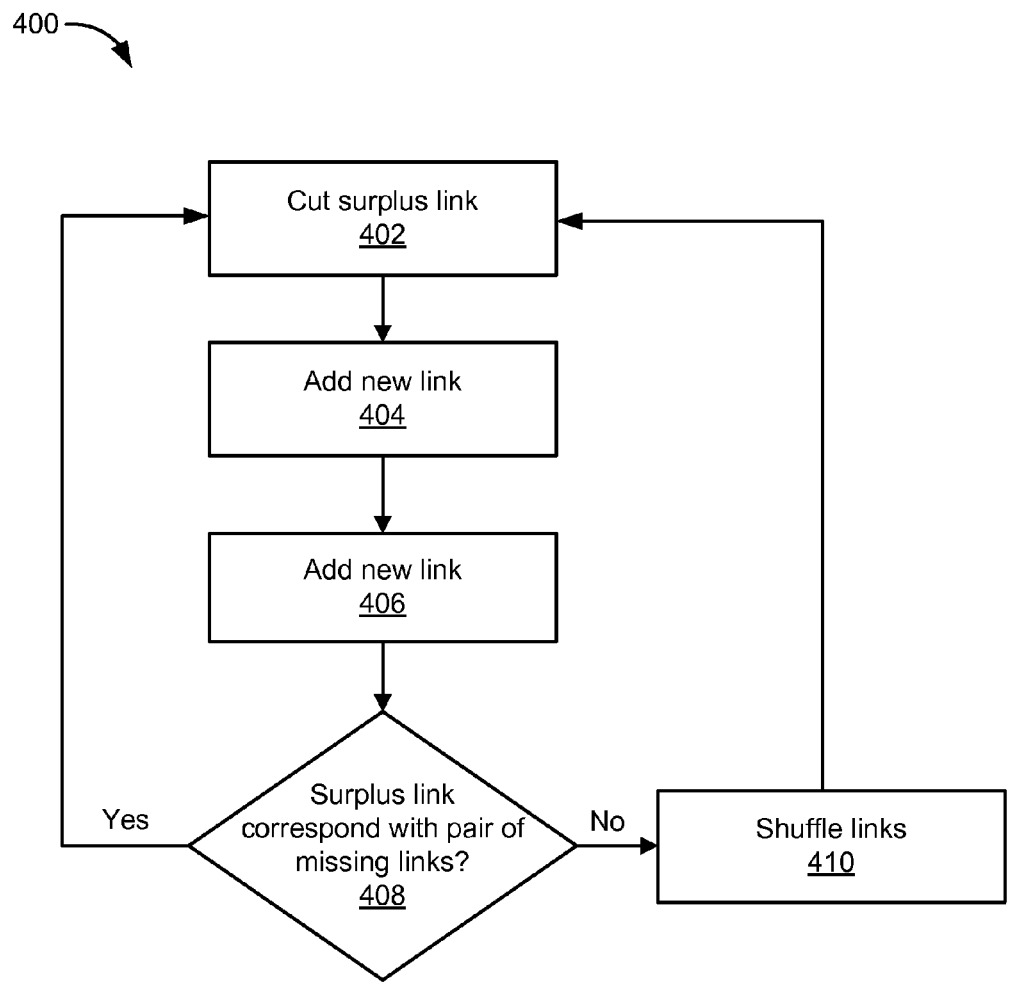
FIG. 4 is a flowchart of an algorithm for adding links to new blocks according to an example implementation.

FIG. 4 is a flowchart of an algorithm 400 for adding links to new blocks according to an example implementation. The algorithm 400 may include cutting a surplus link (402). The surplus link may be cut at a first switch, such as the Switch[0] 210 shown in FIGS. 2A, 2B, and 2C. The surplus link may be between one of the old super blocks 220, 222, 224, 226 and one of the old spine blocks 200, 202, 204, 206.

The algorithm 400 may also include adding a first new link (404). The new link may be added at the first switch, such as the Switch[0] 210. The new link may be between the old super block 220, 222, 224, 226 for which the surplus link was cut in (402) and a new spine block, such as Spine Block[4] 208.

The algorithm 400 may also include adding a second new link (406). The new link may be added at the first switch, such as the Switch[0] 210. The new link may be between the old spine block 200, 202, 204, 206 for which the surplus link was cut in (402), such as Spine Block[1] 202, and a new super block, such as Super Block[4] 228.

The algorithm 400 may include determining whether there are any surplus links that correspond with missing links (408). The determination may include checking the delta matrix 306 to determine whether surplus links may be cut to free old blocks 200, 202, 204, 206, 220, 222, 224, 226 to link with new blocks 208, 228. The determination may include determining whether surplus links may be cut and new links added at a same switch during (402), (404), (406). The surplus links may not be cut and new links added at the same switch if, for example, adding the new links would result in an excess of links at the new super block or the new spine block, as shown and described in the example of FIG. 5B.

If a surplus link does correspond with a pair of missing links, then the algorithm 400 may continue cutting surplus links (402) and adding new links (404, 406) until there are no more surplus links corresponding with missing links. If there is more than one surplus link, then the surplus link to be cut may be selected randomly, by selecting links from a same switch until there are no remaining surplus links with corresponding pairs of links at that switch, or by sequentially selecting different switches, as non-limiting examples. If a surplus link does not correspond with a pair of missing links, then the algorithm 400 may shuffle the links (410). The shuffling the links (410) may include, for example, swapping a link between old blocks 200, 202, 204, 206, 220, 222, 224, 226 from the first switch 210 to a second switch 212. An example of shuffling the links (410) is shown and described with respect to FIGS. 5A through 5H.

FIGS. 5A through 5H show stages of cutting and adding links to add links to new blocks according to an example implementation. In these examples, the first switch 210 includes ports 420A, 422A, 424A, 426A, 428A coupled to super blocks 220, 222, 224, 226, 228 respectively and ports 400A, 402A, 404A, 406A, 408A coupled to spine blocks 200, 202, 204, 206, 208 respectively (ports 408A, 428A are not shown in FIG. 5A for ease of viewing). Also in these examples, the second switch 212 includes ports 420B, 422B, 424B, 426B, 428B coupled to super blocks 220, 222, 224, 226, 228 respectively and ports 400B, 402B, 404B, 406B, 408B coupled to spine blocks 200, 202, 204, 206, 208 respectively (ports 408B, 428B are not shown in FIG. 5A for ease of viewing).

In an example implementation, link 430, coupling Super Block[0] 220 to Spine Block[0] 200, may be surplus, and link 432, coupling Super Block[1] 222 to Spine Block[1] 202, may be surplus. A desired link configuration may be to cut links 430, 432, and add a link between old super block 220 and new spine block 208 via ports 420A, 408A (not shown in FIG. 5B), add a link between old super block 222 and new spine block 208 via ports 422A, 408A, add a link between old spine block 200 and new super block 428 via ports 400A, 428A (not shown in FIG. 5B), and add a link between old spine block 202 and new super block 228 via ports 402A, 428A.

Figure 5A:
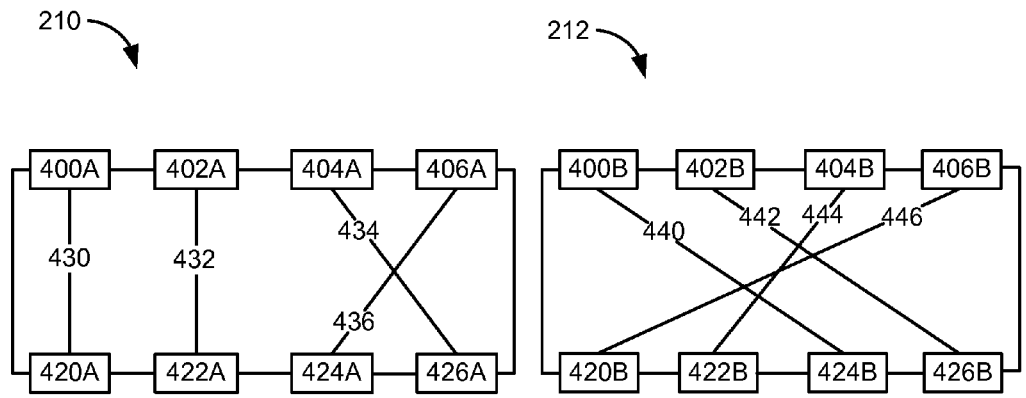
Figure 5B:
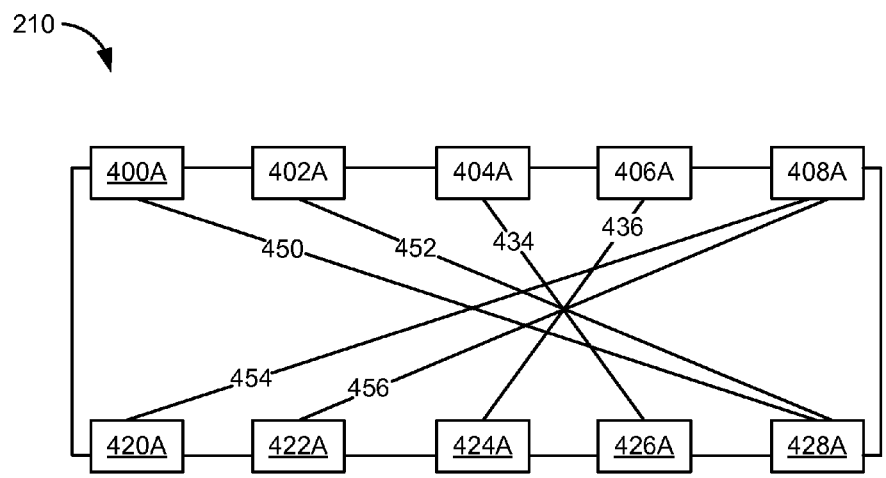

As shown in FIG. 5B, if this link configuration were to be achieved by cutting links 430, 432 in the first switch 210, and adding the links 450, 452, 454, 456 in the first switch, the ports 408A, 428A would impermissibly each be supporting two links.

As shown in FIG. 5C, the desired configuration may be achieved by first cutting link 430 between the first old super block 220 and the first old spine block 200, and adding new links 460, 462 between the first old super block 220 and the new spine block 208 and between the first old spine block 200 and the new super block 228. This cutting of link 430 and adding links 460, 462 results in the configuration shown in FIG. 5D.

In the configuration shown in FIG. 5D, cutting a first old link 432 between a first old super block 222 and a first old spine block 202 on the first switch 210 at the first switch 210, and replacing the first old link 432 with the first new link 456 (shown in FIG. 5B) between the first old super block 222 and the new spine block 208 and the second new link 452 (shown in FIG. 5B) between the first old super block 202 and the new super block 228 at the first switch 210 would impermissibly result in two links at the new super block 228 and two links at the new spine block 208 at the first switch 210, as shown and described with respect to FIG. 5B. To add links between the first old super block 222 and the new spine block 208 and between the first old super block 202 and the new super block 228, the system and/or first switch 210 may swap and/or shuffle the link 432 to the second switch 212. The system may swap the link 432 from the first switch 210 with a link at the second switch 212. The system may, for example, swap the link 432 with link 442 or link 444 at the second switch 212, and/or swap links 432, 434 at the first switch 210 with links 442, 444 at the second switch 212.

FIG. 5E shows links to be cut and added to swap the link 432 from the first switch 210 to the second switch 212. The swapping and/or shuffling may include cutting the first link 432, cutting a second old link 444 at the second switch 212 between the first old super block 222 and a second old spine block, cutting a third old link 442 at the second switch 212 between a second old super block 226 and the first old spine block 202, cutting a fourth old link 434 at the first switch 210 between the second old super block 226 and the second old spine block 204, adding a third new link 466 at the first switch 210 between the first old super block 422 and the second old spine block 204, adding a fourth new link 464 at the first switch between the first old spine block 202 and the second old super block 226, adding a fifth new link 468 at the second switch 212 between the first old super block 222 and the first old spine block 202, and adding a sixth new link 470 at the second switch 212 between the second old super block 226 and the second old spine block 204. After these cuttings and addings, the links may be configured as shown in FIG. 5F.

Figure 5G:
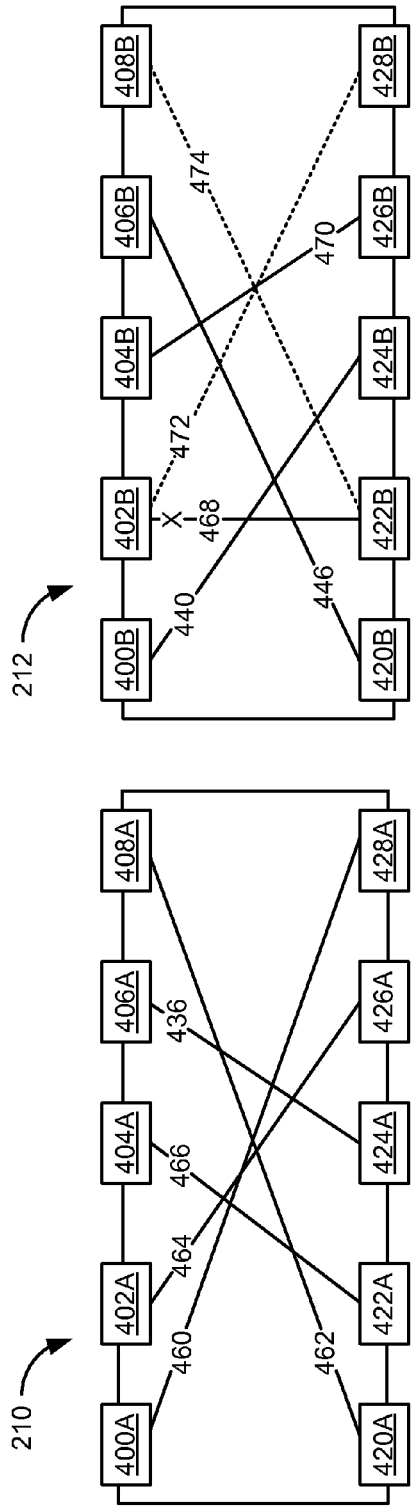
Figure 5H:
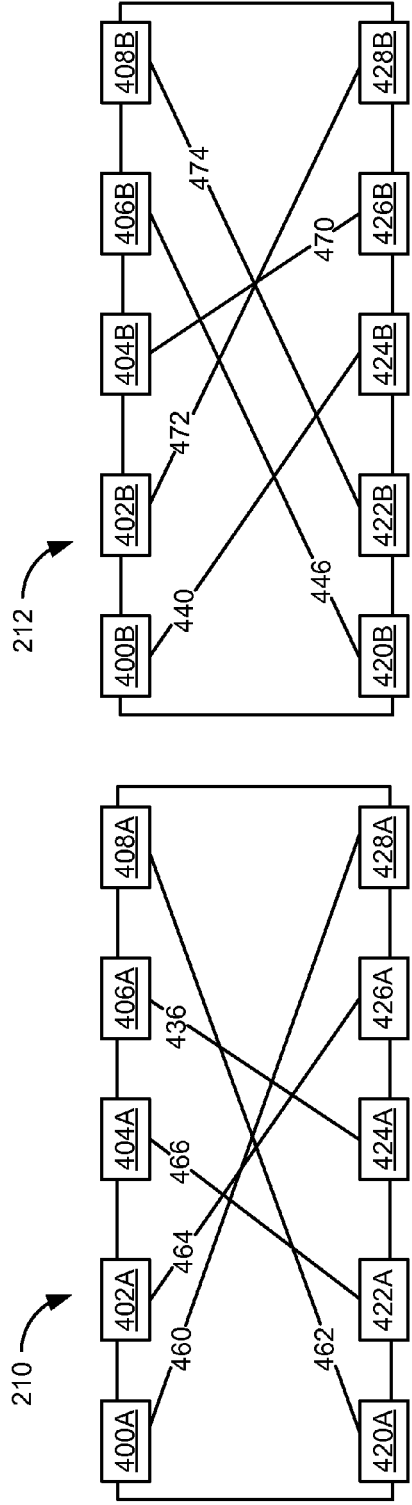

As shown in FIG. 5G, the link 468 at the second switch 212 between the first old super block 222 and the first spine block 202 may be cut, the link 472 added at the second switch 212 between the first old spine block 202 and the new super block 228, and the link 474 added at the second switch 212 between the first old super block 222 and the new super block 208. The configuration may then be as shown in FIG. 5H, with one and only one link at each port 400A, 402A, 404A, 406A, 408A, 420A, 422A, 424A, 426A, 428A, 400B, 402B, 404B, 406B, 408B, 420B, 422B, 424B, 426B, 428B, within the switches 210, 212, and two links to each block 200, 202, 204, 206, 208, 220, 222, 224, 226, 228.

Figure 6:
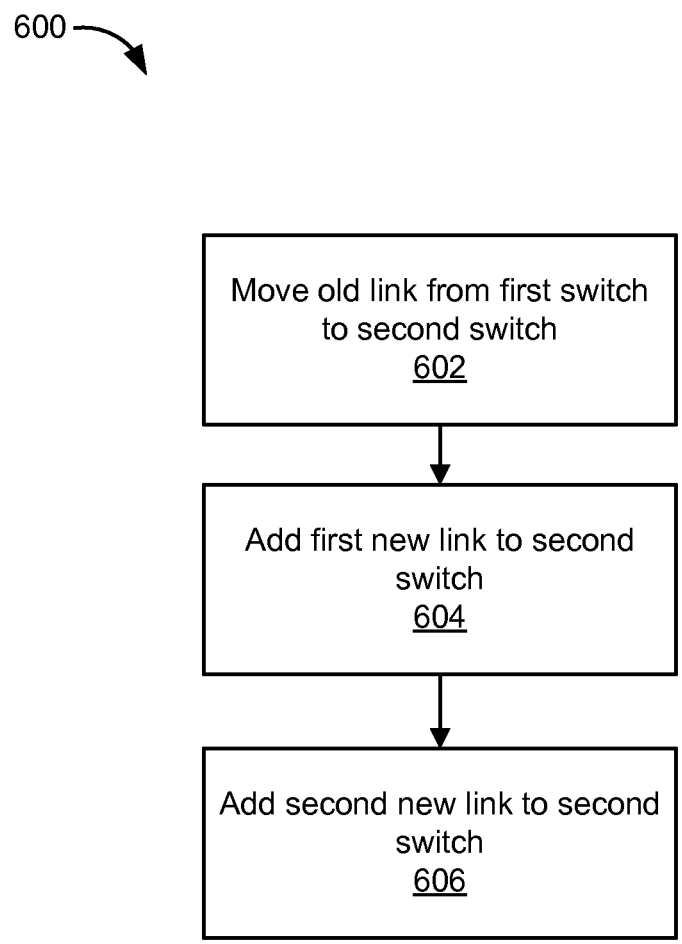
FIG. 6 is a flowchart showing a method for adding links to new blocks according to an example implementation.

FIG. 6 is a flowchart showing a method 600 for adding links to new blocks according to an example implementation. The method 600 may be performed in response to determining that a first old link between a first old super block 220, 222, 224, 226 and a first old spine block 200, 202, 204, 206 should be moved from a first switch 210 to a second switch 212 to add a first new link on the second switch 212 between the first old super block 220, 222, 224, 226 and a new spine block 208 and a second new link on the second switch 212 between a new super block 228 and the first old spine block 200, 202, 204, 206. The method 600 may, for example, be performed in response to a determination at (408) (described above with respect to FIG. 4A) that there is no surplus link corresponding with a pair of missing links through a same switch 210. The method 600 is shown and described in further detail with respect to FIGS. 5A through 5H.

The method 600 may include moving the first old link, which links and/or couples the first old super block 220, 222, 224, 226 to the first old spine block 200, 202, 204, 206, from the first switch 210 to the second switch 212 (602). Moving the first old link from the first switch 210 to the second switch 212 (602) may include cutting the first old link 432 and adding a new link 468, as shown and describe with respect to FIG. 5E.

The method 600 may also include adding a first new link in the second switch 212 (604). The first new link may include the new link 474 shown and described with respect to FIG. 5G, and may be added after the added link 468 has been cut at the second switch 212. The first new link may link and/or couple the first old super block 220, 222, 224, 226 to the new spine block 208.

The method 600 may also include adding a second new link in the second switch 212 (606). The second new link may include the new link 472 shown and described with respect to FIG. 5G, and may be added after the added link 468 has been cut at the second switch 212. The second new link may link and/or couple the new super block 228 to the first old spine block 200, 202, 204, 206.

In an example implementation, each switch 210, 212 may maintain a maximum number, such as one, two, or any integer number, of links per block 200, 202, 204, 206, 208, 220, 222, 224, 226, 228. For example, the first switch 210 may maintain a maximum of one link per super block 220, 222, 224, 226, 228, the first switch 210 may maintain a maximum of one link per spine block 200, 202, 204, 206, 208, the second switch 212 may maintain a maximum of one link per super block 220, 222, 224, 226, 228, and/or the second switch 212 may maintain a maximum of one link per spine block 200, 202, 204, 206, 208.

Figure 7:
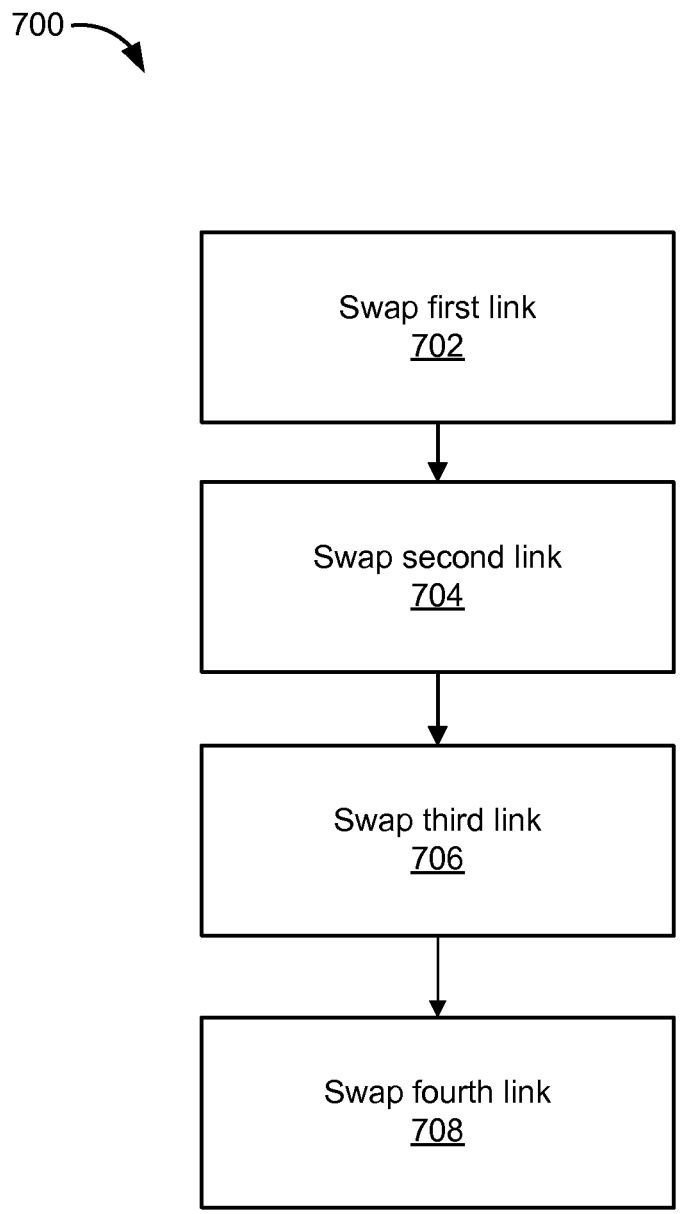
FIG. 7 is a flowchart showing a method for adding links to new blocks according to an example implementation.

FIG. 7 is a flowchart showing a method 700 for adding links to new blocks according to an example implementation. The method 700 may swap links between a first switch and a second switch to facilitate adding links to the second switch that cannot be added to the first switch.

The method 700 may include swapping a first link (702), such as swapping the first link 432 between a first super block 220 and a first spine block 200 from the first switch 210 to the second switch 212. The swapping (702) may include cutting the first old link 432 at the first switch 210 and adding a new link 468 at the second switch 212.

The method 700 may include swapping a second link (704), such as swapping the second link 444 between the first super block 222 and a second spine block 204 from the second switch 212 to the first switch 210. The swapping (704) may include cutting the second old link 444 at the second switch 212 and adding a new link 466 at the first switch 210.

The method 700 may include swapping a third link (706), such as swapping the third link 434 between a second super block 226 and the second spine block 204 from the first switch 210 to the second switch 212. The swapping (706) may include cutting the third old link 434 at the first switch 210 and adding a new link 470 at the second switch 212.

The method 700 may include swapping a fourth link (708), such as swapping the fourth link 442 between the second super block 226 and the first spine block 202 from the second switch 212 to the first switch 210. The swapping (708) may include cutting the fourth old link 442 a the second switch 212 and adding a new link 464 at the first switch 210. The swappings (702, 704, 706, 708) may be performed in any order, according to example implementations. According to an example implementation, within each of the swappings (702, 704, 706, 708), the cutting may be performed before the adding.

Figure 8:
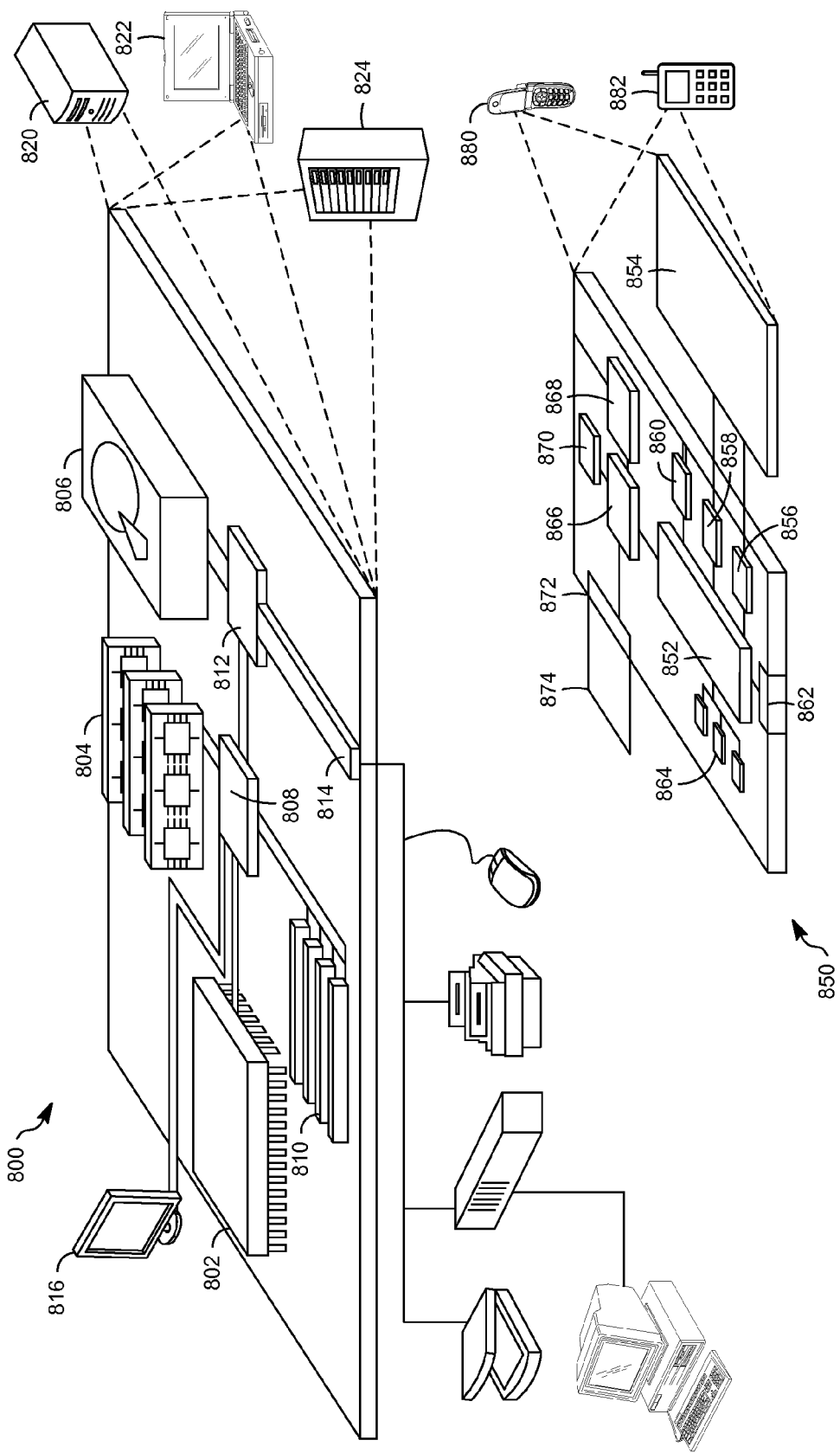
FIG. 8 shows an example of a generic computer device and a generic mobile computer device which may be used with the techniques described herein.

FIG. 8 shows an example of a generic computer device 800 and a generic mobile computer device 850, which may be used with the techniques described herein. Either computer device 800, 850 may perform any or all of the functions and/or processes described above. Computing device 800 is intended to represent various forms of digital computers, such as laptops, desktops, workstations, personal digital assistants, servers, blade servers, mainframes, and other appropriate computers. Computing device 850 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 800 includes a processor 802, memory 804, a storage device 806, a high-speed interface 808 connecting to memory 804 and high-speed expansion ports 810, and a low speed interface 812 connecting to low speed bus 814 and storage device 806. Each of the components 802, 804, 806, 808, 810, and 812, are interconnected using various busses, and may be mounted on a common motherboard or in other manners as appropriate. The processor 802 can process instructions for execution within the computing device 800, including instructions stored in the memory 804 or on the storage device 806 to display graphical information for a GUI on an external input/output device, such as display 816 coupled to high speed interface 808. In other implementations, multiple processors and/or multiple buses may be used, as appropriate, along with multiple memories and types of memory. Also, multiple computing devices 800 may be connected, with each device providing portions of the necessary operations (e.g., as a server bank, a group of blade servers, or a multi-processor system).

The memory 804 stores information within the computing device 800. In one implementation, the memory 804 is a volatile memory unit or units. In another implementation, the memory 804 is a non-volatile memory unit or units. The memory 804 may also be another form of computer-readable medium, such as a magnetic or optical disk.

The storage device 806 is capable of providing mass storage for the computing device 800. In one implementation, the storage device 806 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 804, the storage device 806, or memory on processor 802.

The high speed controller 808 manages bandwidth-intensive operations for the computing device 800, while the low speed controller 812 manages lower bandwidth-intensive operations. Such allocation of functions is exemplary only. In one implementation, the high-speed controller 808 is coupled to memory 804, display 816 (e.g., through a graphics processor or accelerator), and to high-speed expansion ports 810, which may accept various expansion cards (not shown). In the implementation, low-speed controller 812 is coupled to storage device 806 and low-speed expansion port 814. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 800 may be implemented in a number of different forms, as shown in the figure. For example, it may be implemented as a standard server 820, or multiple times in a group of such servers. It may also be implemented as part of a rack server system 824. In addition, it may be implemented in a personal computer such as a laptop computer 822. Alternatively, components from computing device 800 may be combined with other components in a mobile device (not shown), such as device 850. Each of such devices may contain one or more of computing device 800, 850, and an entire system may be made up of multiple computing devices 800, 850 communicating with each other.

Computing device 850 includes a processor 852, memory 864, an input/output device such as a display 854, a communication interface 866, and a transceiver 868, among other components. The device 850 may also be provided with a storage device, such as a microdrive or other device, to provide additional storage. Each of the components 850, 852, 864, 854, 866, and 868, are interconnected using various buses, and several of the components may be mounted on a common motherboard or in other manners as appropriate.

The processor 852 can execute instructions within the computing device 850, including instructions stored in the memory 864. The processor may be implemented as a chipset of chips that include separate and multiple analog and digital processors. The processor may provide, for example, for coordination of the other components of the device 850, such as control of user interfaces, applications run by device 850, and wireless communication by device 850.

Processor 852 may communicate with a user through control interface 858 and display interface 856 coupled to a display 854. The display 854 may be, for example, a TFT LCD (Thin-Film-Transistor Liquid Crystal Display) or an OLED (Organic Light Emitting Diode) display, or other appropriate display technology. The display interface 856 may comprise appropriate circuitry for driving the display 854 to present graphical and other information to a user. The control interface 858 may receive commands from a user and convert them for submission to the processor 852. In addition, an external interface 862 may be provide in communication with processor 852, so as to enable near area communication of device 850 with other devices. External interface 862 may provide, for example, for wired communication in some implementations, or for wireless communication in other implementations, and multiple interfaces may also be used.

The memory 864 stores information within the computing device 850. The memory 864 can be implemented as one or more of a computer-readable medium or media, a volatile memory unit or units, or a non-volatile memory unit or units. Expansion memory 874 may also be provided and connected to device 850 through expansion interface 872, which may include, for example, a SIMM (Single In Line Memory Module) card interface. Such expansion memory 874 may provide extra storage space for device 850, or may also store applications or other information for device 850. Specifically, expansion memory 874 may include instructions to carry out or supplement the processes described above, and may include secure information also. Thus, for example, expansion memory 874 may be provide as a security module for device 850, and may be programmed with instructions that permit secure use of device 850. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 864, expansion memory 874, or memory on processor 852, that may be received, for example, over transceiver 868 or external interface 862.

Device 850 may communicate wirelessly through communication interface 866, which may include digital signal processing circuitry where necessary. Communication interface 866 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 868. In addition, short-range communication may occur, such as using a Bluetooth, WiFi, or other such transceiver (not shown). In addition, GPS (Global Positioning System) receiver module 870 may provide additional navigation- and location-related wireless data to device 850, which may be used as appropriate by applications running on device 850.

Device 850 may also communicate audibly using audio codec 860, which may receive spoken information from a user and convert it to usable digital information. Audio codec 860 may likewise generate audible sound for a user, such as through a speaker, e.g., in a handset of device 850. Such sound may include sound from voice telephone calls, may include recorded sound (e.g., voice messages, music files, etc.) and may also include sound generated by applications operating on device 850.

The computing device 850 may be implemented in a number of different forms, as shown in the figure. For example, it may be implemented as a cellular telephone 880. It may also be implemented as part of a smart phone 882, personal digital assistant, or other similar mobile device.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments of the invention.

What is claimed is:

1. A non-transitory computer-readable storage medium comprising instructions stored thereon that, when executed by at least one processor, are configured to cause a computing system to at least:
    cut, at a first switch, a surplus link between an old super block and an old spine block, the old super block being one of a plurality of old super blocks and the old spine block being one of a plurality of old spine blocks;
    add, at the first switch, a first new link between the old super block and a new spine block;
    add, at the first switch, a second new link between the old spine block and a new super block;
    continue to cut surplus links and add new links at the first switch until determining that adding a new link at the first switch would result in an excess of links at either the new super block or the new spine block; and
    in addition to cutting the surplus link and adding the first and second new links, swap a link from the first switch with a link from a second switch based on the determining that adding the new link at the first switch would result in the excess of links at either the new super block or the new spine block.

2. The non-transitory computer-readable storage medium of claim 1, wherein:
    the first switch includes a first hybrid electrical/optical switch with optical links coupling the super blocks and the spine blocks and electrical couplings to the super blocks and the spine blocks; and
    the second switch includes a second hybrid electrical/optical switch with optical links coupling the super blocks and the spine blocks and electrical couplings to the super blocks and the spine blocks.

3. The non-transitory computer-readable storage medium of claim 1, wherein:
    the first switch is configured to link a maximum of an integer number L spine blocks to each super block and a maximum of L super blocks to each spine block; and
    the second switch is configured to link L spine blocks to each super block and a maximum of L super blocks to each spine block.

4. The non-transitory computer-readable storage medium of claim 1, wherein the instructions are further configured to cause the computing system to randomly select the second switch from a plurality of switches before swapping the link from the first switch with the link from the second switch.

5. The non-transitory computer-readable storage medium of claim 1, wherein the instructions are further configured to cause the computing system to:
    cut, at the second switch after the swap, a surplus link between a second old super block and a second old spine block;
    add, at the second switch, a third new link between the second old super block and the new spine block; and
    add, at the second switch, a fourth new link between the second old spine block and the new super block.

6. The non-transitory computer-readable storage medium of claim 1, wherein the instructions are further configured to cause the computing system to:
    determine numbers of surplus links between each the plurality of old super blocks and each of the plurality of old spine blocks;
    determine a number of new links to add to the new super block; and determine a number of new links to add to the new spine block,
        wherein the cutting comprises cutting the determined number of surplus links between each of the plurality of old super blocks and each of the plurality of old spine blocks,
        wherein adding new links comprises adding the determined number of new links to the new super block and the determined number of new links to the new spine block.

7. A non-transitory computer-readable storage medium comprising instructions stored thereon that, when executed by at least one processor, are configured to cause a computing system to at least:
    determine that a first old link between a first old super block and a first old spine block should be moved from a first switch to a second switch to add a first new link on the second switch between the first old super block and a new spine block and a second new link on the second switch between a new super block and the first old spine block;
    move the first old link between the first old super block and the first old spine block from the first switch to the second switch; and
    in addition to moving the first old link:
        add, on the second switch, the first new link between the first old super block and the new spine block; and
        add, on the second switch, the second new link between the new super block and the first old spine block.

8. The non-transitory computer-readable storage medium of claim 7, wherein the first switch includes a hybrid electrical/optical switch with optical links between the super blocks and the spine blocks and electrical couplings to the super blocks and the spine blocks.

9. The non-transitory computer-readable storage medium of claim 7,
    wherein the moving the first old link between the first old super block and the first old spine block from the first switch to the second switch comprises:
    maintaining, at the first switch, a maximum of one link per super block; maintaining, at the first switch, a maximum of one link per spine block; maintaining, at the second switch, a maximum of one link per super block; and maintaining, at the second switch, a maximum of one link per spine block.

10. The non-transitory computer-readable storage medium of claim 7 wherein the instructions are further configured to cause the computing system to randomly select the second switch from a plurality of switches after determining that the first old link between the first old super block and the first old spine block should be moved from the first switch to another switch.

11. The non-transitory computer-readable storage medium of claim 7 wherein the instructions are further configured to cause the computing system to:
    cut, on the second switch before adding the first new link and the second new link, the first old link between the first old super block and the first old spine block.

12. The non-transitory computer-readable storage medium of claim 7, wherein:

a number of links that are added between the first old super block and any spine blocks is equal to a number of links that are cut between the first old super block and any spine blocks.

13. The non-transitory computer-readable storage medium of claim 7, wherein:
a number of links that are added between the first old spine block and any super blocks is equal to a number of links that are cut between the first old spine block and any super blocks.

14. The non-transitory computer-readable storage medium of claim 7, wherein the moving the first old link between the first old super block and the first old spine block from the first switch to the second switch comprises:
cutting, on the first switch, the first old link between the first old super block and the first old spine block;
cutting, on a second switch, a second old link between the first old super block and a second old spine block;
cutting, on the second switch, a third old link between a second old super block and the first old spine block;
cutting, on the first switch, a fourth old link between the second old super block and the second old spine block;
adding, on the first switch, a third new link between the first old super block and the second old spine block;
adding, on the first switch, a fourth new link between the second old super block and the first old super block;
adding, on the second switch, a fifth new link between the first old super block and the first old spine block; and
adding, on the second switch, a sixth new link between the second old super block and the second old spine block.

15. The non-transitory computer-readable storage medium of claim 14, wherein the first switch includes a hybrid electrical/optical switch comprising:
optical links between the super blocks and the spine blocks; and electrical couplings to the super blocks and the spine blocks.

16. The non-transitory computer-readable storage medium of claim 15, wherein the first switch maintains electrical coupling with the first old super block, the second old super block, the first old spine block, and the second old spine block while cutting the first old link and the fourth old link.

17. The non-transitory computer-readable storage medium of claim 16, wherein the second switch maintains electrical coupling with the first old super block, the second old super block, the first old spine block, and the second old spine block while cutting the second old link and the third old link.

18. The non-transitory computer-readable storage medium of claim 14, wherein the instructions are further configured to cause the computing system to:
cut, on the second switch, the fifth new link between the first old super block and the first old spine block;
add, on the second switch, the first new link between the first old super block and the new spine block; and
add, on the second switch, the second new link between the first old spine block and the new super block.

19. A non-transitory computer-readable storage medium comprising instructions stored thereon for swapping links between a first switch and a second switch to facilitate adding links to the second switch that cannot be added to the first switch, the instructions being configured to, when executed by at least one processor, cause a computing system to at least:
swap a first link between a first super block and a first spine block from the first switch to the second switch;
swap a second link between the first super block and a second spine block from the second switch to the first switch;
swap a third link between a second super block and the second spine block from the first switch to the second switch; and
swap a fourth link between the second super block and the first spine block from the second switch to the first switch.

20. The non-transitory computer-readable storage medium of claim 19, wherein the first switch includes a hybrid electrical/optical switch with optical links between the super blocks and the spine blocks and electrical couplings to the super blocks and the spine blocks.

* * * * *